United States Patent [19]

Plestan

[11] Patent Number: 5,799,889
[45] Date of Patent: Sep. 1, 1998

[54] COMPOSITE BAIL FOR A SPINNING REEL AND REEL INCORPORATING SUCH A BAIL

[75] Inventor: M. Alain Plestan, Marignier, France

[73] Assignee: Johnson Worldwide Associates, Inc., Racine, Wis.

[21] Appl. No.: 881,545

[22] Filed: Jun. 24, 1997

[51] Int. Cl.⁶ .................................................. A01K 89/01
[52] U.S. Cl. ...................................... 242/231; 242/323
[58] Field of Search ........................... 242/323, 230, 242/231, 232, 233

[56] References Cited

U.S. PATENT DOCUMENTS

| | | |
|---|---|---|
| 2,904,281 | 9/1959 | Jackson . |
| 3,670,984 | 6/1972 | Lemery . |
| 3,771,741 | 11/1973 | Stein ................................ 242/231 |
| 4,171,108 | 10/1979 | Ishida et al. ....................... 242/231 |
| 4,874,144 | 10/1989 | Murakami . |
| 4,884,761 | 12/1989 | Kuntze . |
| 5,261,627 | 11/1993 | Shinohara ........................ 242/231 |
| 5,312,067 | 5/1994 | Sugawara et al. ................ 242/232 |
| 5,513,813 | 5/1996 | Bernard et al. . |

*Primary Examiner*—Katherine Matecki
*Attorney, Agent, or Firm*—Foley & Lardner

[57] ABSTRACT

A bail for a spinning fishing reel is provided. The reel includes a reciprocating spool for storing fishing line and a rotor mounted for rotation about the spool to retrieve and wind the line around the spool. The reel further includes a crank arm which, when actuated, causes reciprocating motion of the spool and rotation of the rotor. The bail includes first and second support ends and a central section coupled between the first and second ends. The first and second ends are coupled to the rotor at opposed locations and are pivotable with respect to the rotor to move the bail between an open and a closed position. In the open position a user may cast the line and in the closed position retrieve it. When the bail is in the closed position, the central section guides the line to a line guide. The bail further includes at least one counterbalance weight supported on the central section. The weight provides rotational balancing of the rotor to ensure smooth operation of the reel.

20 Claims, 2 Drawing Sheets

COMPOSITE BAIL FOR A SPINNING REEL AND REEL INCORPORATING SUCH A BAIL

BACKGROUND OF THE INVENTION

The present invention relates generally to fishing reels of the type including a bail movable between open and closed positions for casting from and retrieving line to a storage spool. More particularly, the invention relates to a spinning reel having a composite, profiled bail adapted to contact and guide the line to a guide roller. The composite bail advantageously includes one or more balancing weights for enhancing smooth rotation of the spool rotor during operation.

Various types and designs of fishing reels have been proposed and are currently available for casting and retrieving fishing line stored on a reel spool. In one type of fishing reel, commonly referred to as a spinning reel, a reciprocating line storage spool is surrounded, at least partially, by a rotor supported for rotation about the longitudinal axis of the spool. The spool and rotor are coupled, through a drive train, to a crank handle which is turned by a user to reciprocate the spool while rotating the rotor for line retrieval. A bail, typically including a bent metallic wire portion, is pivotally coupled to the rotor at diametrically opposed points on either side of the spool. The bail may be rotated into an open position wherein the spool is unobstructed and line may be freely cast therefrom. Following casting, rotation of the crank handle operates a trigger mechanism that toggles the bail back to a spring-biased closed position wherein the bail rests generally perpendicular to the spool axis and rotates with the rotor. A guide roller, coupled to one side of the bail, collects line as the rotor and bail are rotated and feeds the line onto the spool.

While such conventional spinning reels offer a generally effective means of casting and retrieving line, they are not without drawbacks. For example, wire bails provide a light weight and simple guide for moving line to a guide roller for retrieval, but may be bent during transport or storage of the reel.

In addition, because wire bails must be supported in pivotal housings on either side of the rotor, a step transition must typically be made between the bail wire and the support housing, creating a location that is susceptible to snagging the line, particularly if the bail wire becomes loose in the support housing through use. Moreover, while the rotating elements of the reel, including the rotor and bail structure, must be carefully balanced during design and manufacture of the reel to ensure smooth operation, the conventional wire bail structure offers the reel designer little or no platform for enlarged or otherwise weighted regions offering counterbalance to other portions of the rotating structure.

While certain departures from the conventional wire bail design have been suggested in the prior art, these have not generally provided the desired platform for smooth line guidance and counterbalance weighting. For example, U.S. Pat. No. 4,884,761 describes an entirely plastic bail having a nonsymmetrical cross-sectional shape. Similarly, U.S. Pat. No. 5,513,813 describes a spinning reel having a profiled bail designed to cooperate with other spool elements to pinch the line slightly during retrieval to enhance winding regularity. However, as described therein, the bail includes no counterbalancing features.

There is a need, therefore, for an improved bail device that provides both smooth line guidance and some degree of counterbalancing for other rotating elements of a fishing reel. In particular, there is a need for a bail that is both rugged and economical to manufacture and that permits incorporation therein of one or more counterbalancing weights along its length. There is also a need for an improved reel incorporating such a bail, providing at least one additional platform for counterbalancing weights, such as around a portion of the rotor.

SUMMARY OF THE INVENTION

The invention features an innovative bail, rotor and reel structure designed to respond to these needs. The structure provides a light-weight and smooth bail arm, preferably made of a moldable plastic material, to which one or more counterbalance weights may be added at selected locations to enhance performance and rotational balance of the bail and rotor. In addition to the platform provided on the bail arm, one or more counterbalance weights may be added to the rotor body, thereby providing both axial and radial balancing of the various elements of the body. In a particularly preferred embodiment, the bail is formed as a single-piece, integral unit to which a line guide roller and counterbalance weight may be added during assembly of the rotor. The resulting structure is both economical to manufacture and service, and resistant to forces encountered during use.

Thus, in accordance with a first aspect of the invention, a bail is provided for a fishing reel of the type including a reciprocating spool for storing fishing line and a rotor mounted for rotation about the spool for retrieving fishing line and for storing the line on the spool. The spool and rotor are coupled to a crank arm, whereby actuation of the crank arm causes reciprocating motion of the spool and rotation of the rotor. The bail includes first and second support ends coupled to the rotor at opposed locations and pivotable with respect to the rotor for movement of the bail between open and closed positions for casting and retrieving line, respectively. A central section is coupled between the first and second support ends for guiding line to a line guide upon movement of the bail from the open position to the closed position. At least one counterbalance weight is supported on the central section to provide rotational balancing of the rotor.

In accordance with another aspect of the invention, a rotor is provided for a fishing reel. The rotor includes a body, a bail and at least one counterbalance weight. The body at least partially surrounds the reel spool and is rotatable about the spool. The bail has first and second support ends and a central section. The first and second support ends are coupled to the rotor body at opposed locations and pivotable with respect to the rotor body for movement of the bail between open and closed positions for casting and retrieving line, respectively. The central section is coupled between the first and second support ends for guiding line to a line guide upon movement of the bail from the open position to the closed position. The counterbalance weight is supported on the central section and provides rotational balancing of the rotor.

In accordance with a further aspect of the invention, a fishing reel is provided that includes a reel body, a spool, and a rotor. The spool is supported on the reel body, the spool has a central axis and an annular recess surrounding the central axis for storing fishing line. The rotor is mounted on the reel body for rotation about the central axis for retrieving fishing line and for storing the line in the recess. The rotor is coupled to a crank arm whereby actuation of the crank arm causes rotation of the rotor. The rotor comprises a rotor body, a bail and at least one counterbalance weight. The bail, in turn, has first and second support ends and a contoured central section. The first and second support ends are coupled to the rotor body at opposed locations and are pivotable with respect to the rotor body for movement of the bail between open and closed positions for casting and retrieving line, respectively. The central section is coupled between the first and second support ends for guiding line to a line guide upon movement of the bail from the open position to the closed position. The counterbalance weight is supported on the central section for providing rotational balancing of the rotor.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
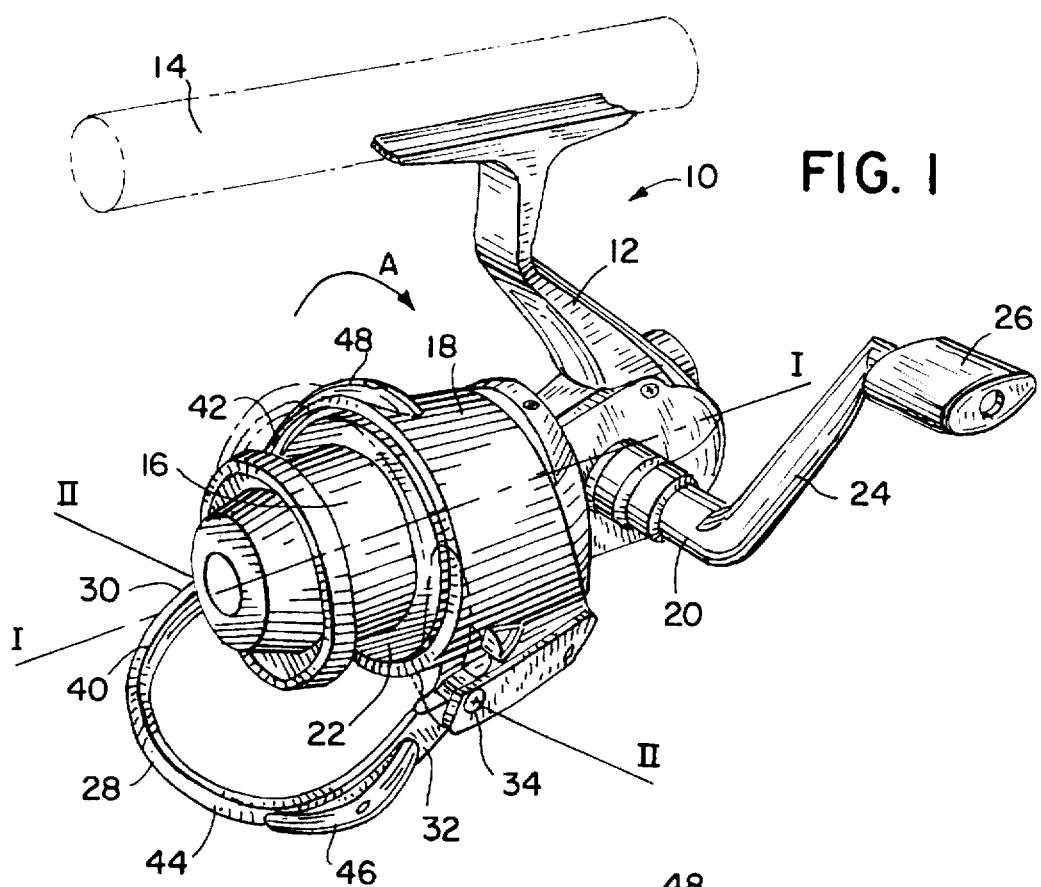
FIG. 1 is a perspective view of a fishing reel incorporating features of the invention, including a balanced rotor and composite bail assembly, the bail being shown in solid lines in the open position and in broken lines in its closed or line retrieval position.
Figure 2:
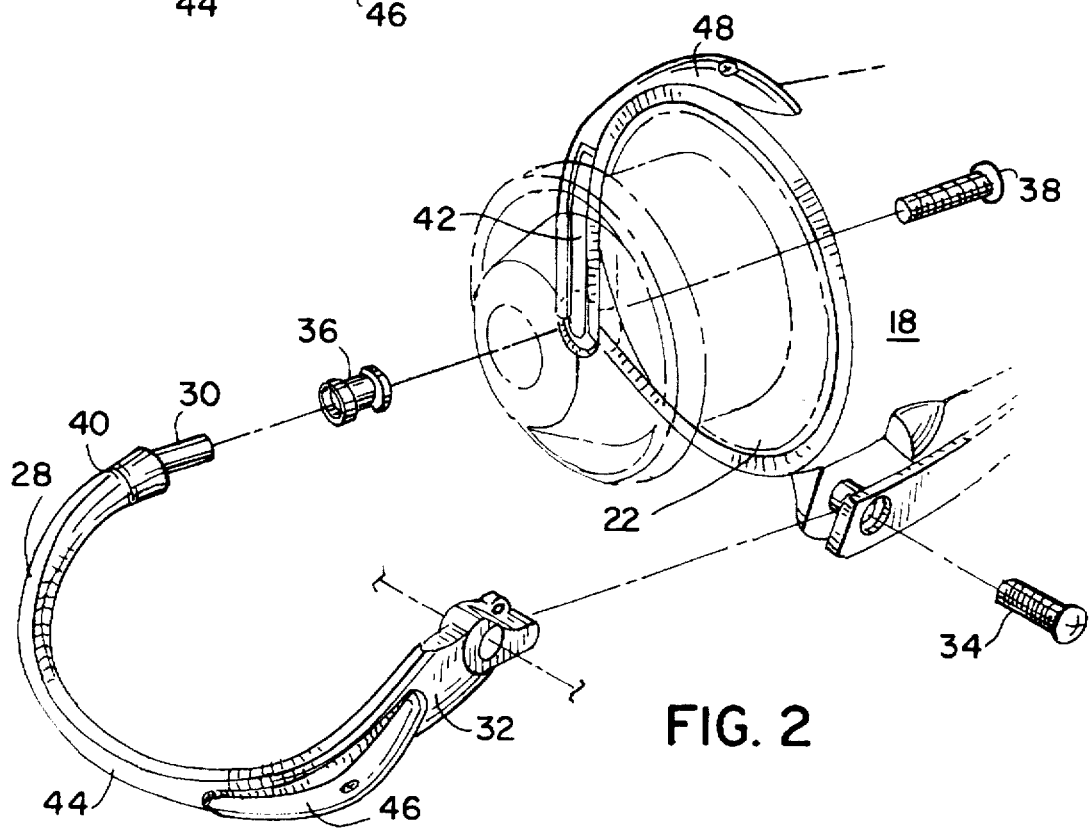
FIG. 2 is a partially exploded perspective view of the reel of FIG. 1, illustrating the elements of the bail assembly and the manner in which they are supported on the rotor.
Figure 3:
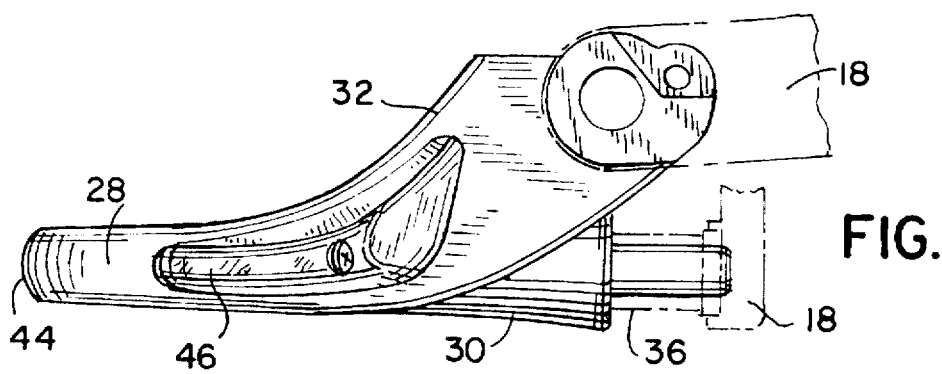
FIG. 3 is a side view of the bail assembly shown in FIG. 2, illustrating a presently preferred arrangement for mounting the bail pivotably on the rotor.
Figure 4:
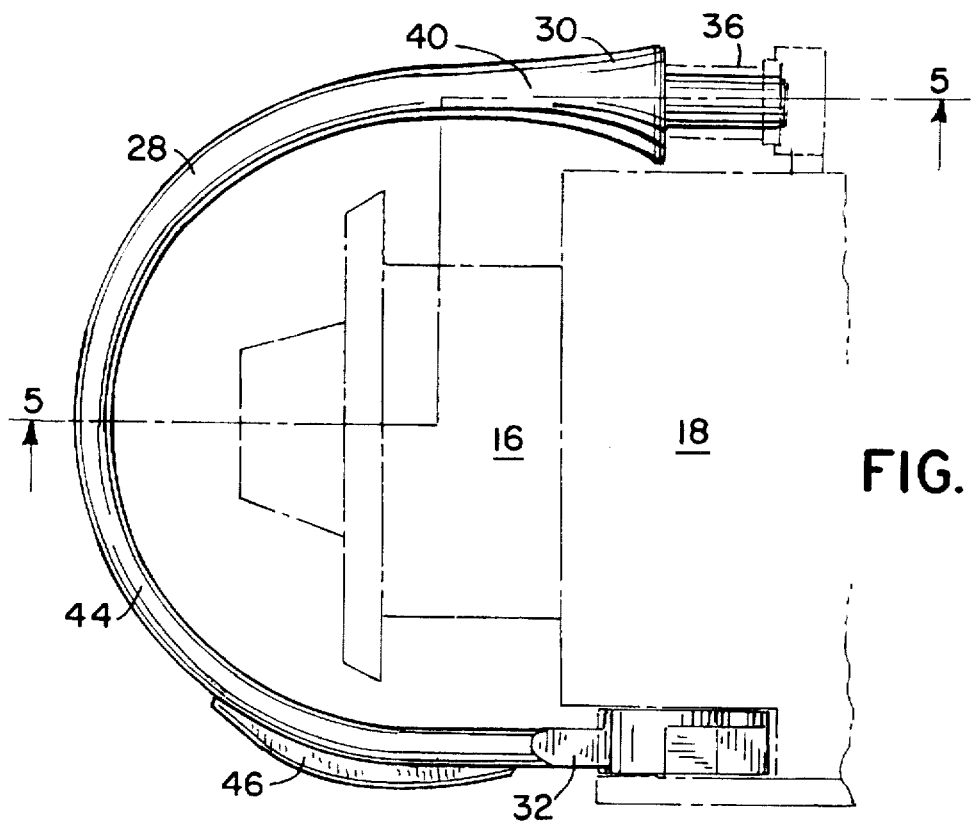
FIG. 4 is a top view of the bail assembly of FIG. 2 illustrating the manner in which the bail support ends are coupled to the rotor.
Figure 5:
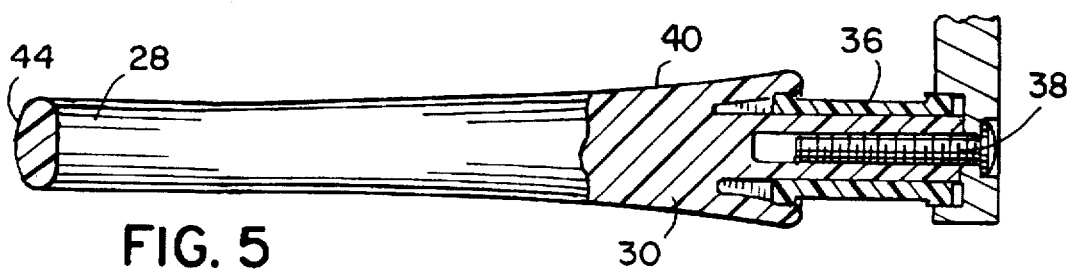
FIG. 5 is a sectional view taken along line 5—5 of FIG. 4, showing the preferred cross-sectional profile of the bail and the manner in which the line guide roller is supported in the assembled rotor unit.

Turning now to the drawings and referring to FIG. 1, a standard fishing reel 10 for casting comprises a reel body 12 attached to a fishing rod 14 (shown in broken lines). Reel body 12 supports a detachable spool 16 around which a fishing line (not shown) is wound. Spool 16 has a longitudinal axis of symmetry I—I which is substantially parallel to the lengthwise direction of fishing rod 14.

Reel body 12 includes a rotor or flyer 18 and a crank 20. Rotor 18 has an upstanding wall portion 22, defining an interior cylindrical region, which encompasses a portion of spool 16. Crank 20 is coupled to spool 16 and rotor 18 through a drive train located inside reel body 12. Crank 20 has an arm 24 and a handle 26. As will be described in more detail below, when crank 20 is operated by a user, rotor 18 rotates and spool 16 reciprocates to retrieve and rewind the fishing line around spool 16.

Rotor 18 also includes a retractable line recovery bail 28 which is pivotally coupled to rotor 18. Rotor 18 may pivot about axis II—II between an open position, shown in solid lines in FIG. 1, and a closed, recovery position, shown in broken lines. In the open position, bail 28 is pivoted away from spool 16, leaving spool 16 unobstructed and allowing the user to freely cast a line. In the closed position, bail 28 encircles spool 16 and extends generally perpendicular to axis I—I of spool 16. Retrieval of the line occurs when bail 28 is in the closed position.

As depicted more clearly in FIGS. 2–5, bail 28 is pivotally mounted to rotor 18 at a first end 30 and a second end 32. First and second ends 30 and 32 are disposed on opposite sides of rotor 18 and mounted via screws 34 (screw for first end not shown) and sleeves (not shown). First end 30 of bail 28 rotatably supports a line guide 36 for directing the fishing line to spool 16. Line guide 36 is secured onto first end 30 of bail 28 by a screw 38 and inset within rotor 18. Line guide 36 preferably comprises a guide roller 37. Roller 37 is wider than conventional rollers and presents the fishing line tangent to spool 16, thereby eliminating line twist. First end 30 includes a pinch surface 40 located adjacent to roller 37. Pinch surface 40 contacts a corresponding movable pinch surface 42 on rotor 18 when bail 28 is in the closed, recovery position. Pinch surfaces 40 and 42 are shaped to be pressed together and to increase tension in the line, so that the line may be wound around spool 16 with more regularity. Pinch surfaces 40 and 42 are described in greater detail in U.S. Pat. No. 5,513,813 issued on May 7, 1996 and assigned to Mitchell Sports.

Extending between first and second ends 30 and 32 of bail 28 is a contoured central section 44 for guiding the line to roller 37. Central section 44 is generally semi-circular in shape and has a smooth profile which contacts the fishing line. The smooth profile of central section 44 of bail 28 allows the line to slide along bail 28 to roller 37. Thus, retrieval of the fishing line works as follows. When the user operates crank 20, rotor 18 revolves about axis I—I of spool 16 in the direction shown by arrow A (FIG. 1). As a result, the fishing line is progressively engaged around first end 30 of bail 28. The line slides laterally between pinch surfaces 40 and 42 until it is received between roller 37 and pinch surface 42 of rotor 18. While rotor 18 revolves, spool 16 reciprocates along axis I—I, into and out of rotor 18. The combined rotating and reciprocating motions of rotor 18 and spool 16, respectively, wind the fishing line neatly around spool 16.

Bail 28 is preferably made of a moldable composite material, such as graphite or glass-filled nylon. Composite bail 28 may be molded as a single piece, having first and second ends 30 and 32 integral with central portion 44. Thus, composite bail 28 may be easier and cheaper to manufacture than a wire bail which requires a pivotal support housing for each end of the wire. A composite bail that is integrally molded has a smooth and continuous profile, thereby reducing or eliminating the chance of line snagging. In addition, composite bail 28 results in a durable bail that is not susceptible to bending.

To enhance the operation of reel 10, a counterbalance weight 46 is mounted on bail 28. In addition to weight 46 on bail 28, a second counterbalance weight 48 may be added to rotor 18. Weights 46 and 48 are positioned to provide axial and radial balancing of reel 10 so that rotor 18 revolves smoothly about axis I—I. In the preferred embodiment of the invention, weight 46 is located proximate second end 32. The proper mass and location of weights 46 and 48 may be computer calculated or determined by a balancing machine. Weights 46 and 48 are preferably made of a moldable, metallic material such as zinc. However, other metals like brass and steel may be used. Weights 46 and 48 are coupled to bail 28 and rotor 18, respectively, by screws or other mechanical fasteners. In the alternative, an adhesive may be used to secure weights 46 and 48.

While the embodiments illustrated in the FIGURES and described above are presently preferred, it should be understood that these embodiments are offered by way of example only and may be adapted to various other structures. For example, while the FIGURES show counterbalance weight 46 mounted on the outside surface of bail 28, weight 46 may also be insert molded and fully enclosed in bail 28 or otherwise integrally formed with bail 28. Moreover, in addition to composite bails, counterbalance weights 46 may be utilized on other well-known bails, including those made of wire. Furthermore, bail 28 may be formed from two or more pieces secured together, rather than from a single piece.

What is claimed is:

1. A bail for a fishing reel, the reel including a reciprocating spool for storing fishing line and a rotor mounted for rotation about the spool for retrieving fishing line and for storing the line on the spool, the spool and rotor being coupled to a crank arm whereby actuation of the crank arm causes reciprocating motion of the spool and rotation of the rotor, the bail comprising:

first and second support ends coupled to the rotor at opposed locations and pivotable with respect to the rotor for movement of the bail between open and closed positions for casting and retrieving line, respectively;

a central section coupled between the first and second support ends for guiding line to a line guide upon movement of the bail from the open position to the closed position; and at least one counterbalance weight supported on the central section, the weight providing rotational balancing of the rotor during rotation.

2. The bail of claim 1, wherein the first support end is integral with the central section.

3. The bail of claim 2, wherein the second support end is integral with the central section.

4. The bail of claim 1, wherein the central section is made of a moldable plastic material and the counterbalance weight is made of a metallic material.

5. The bail of claim 1, wherein the line guide includes a roller coupled adjacent to the first end of the bail and rotatable with respect to the central section.

6. The bail of claim 1, wherein the counterbalance weight is disposed on an outer surface of the central section.

7. A rotor for a fishing reel, the reel including a reciprocating spool for storing fishing line, the rotor being mounted for rotation about the spool for retrieving fishing line and for storing the line on the spool, the spool and rotor being coupled to a crank arm whereby actuation of the crank arm causes reciprocating motion of the spool and rotation of the rotor, the rotor comprising:

a body at least partially surrounding the spool;

a bail having first and second support ends and a central section, the first and second support ends being coupled to the rotor body at opposed locations and pivotable with respect to the rotor body for movement of the bail between open and closed positions for casting and retrieving line, respectively, the central section coupled between the first and second support ends for guiding line to a line guide upon movement of the bail from the open position to the closed position; and at least one counterbalance weight supported on the central section, the weight providing rotational balancing of the rotor during rotation.

8. The rotor of claim 7, wherein the body includes an upstanding wall portion completely encircling the spool.

9. The rotor of claim 7, wherein the rotor body includes at least one second counterbalance weight providing rotational balancing of the rotor during rotation.

10. The rotor of claim 9, wherein the first support end is integral with the central section.

11. The rotor of claim 9, wherein the second support end is integral with the central section.

12. The rotor of claim 9, wherein the central section is made of a moldable plastic material and the counterbalance weight is made of a metallic material.

13. The rotor of claim 9, wherein the line guide includes a roller coupled adjacent to the first end of the bail and rotatable with respect to the central section.

14. The rotor of claim 9, wherein the counterbalance weight is disposed on an outer surface of the central section.

15. A fishing reel comprising:

a reel body;

a spool supported on the reel body, the spool having a central axis and an annular recess surrounding the central axis for storing fishing line;

a rotor mounted on the reel body for rotation about the central axis for retrieving fishing line and for storing the line in the recess, the rotor being coupled to a crank arm whereby actuation of the crank arm causes rotation of the rotor, the rotor comprising a rotor body, a bail and at least one counterbalance weight, the bail having first and second support ends and a contoured central section, the first and second support ends being coupled to the rotor body at opposed locations and pivotable with respect to the rotor body for movement of the bail between open and closed positions for casting and retrieving line, respectively, the central section coupled between the first and second support ends for guiding line to a line guide upon movement of the bail from the open position to the closed position, the at least one counterbalance weight supported on the central section, the weight providing rotational balancing of the rotor during rotation.

16. The reel of claim 15, wherein the spool is mounted for reciprocating motion along the central axis.

17. The reel of claim 15, wherein the rotor includes at least one second counterbalance weight secured to the rotor body providing rotational balancing of the rotor.

18. The reel of claim 15, wherein the rotor body includes an upstanding wall portion completely encircling the spool.

19. The reel of claim 15, wherein the first and second ends of the bail are integral with the contoured central section.

20. The reel of claim 15, wherein the central section of made of a moldable plastic material and the counterbalance weight is made of a metallic material.

* * * * *